United States Patent
Suciu et al.

(10) Patent No.: US 11,098,678 B2
(45) Date of Patent: Aug. 24, 2021

(54) AFT COUNTER-ROTATING BOUNDARY LAYER INGESTION ENGINE

(71) Applicant: United Technologies Corporation, Farmington, CT (US)

(72) Inventors: Gabriel L. Suciu, Glastonbury, CT (US); Jesse M. Chandler, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 268 days.

(21) Appl. No.: 15/945,907

(22) Filed: Apr. 5, 2018

(65) Prior Publication Data

US 2019/0309705 A1 Oct. 10, 2019

(51) Int. Cl.
| | |
|---|---|
| *F02K 3/072* | (2006.01) |
| *F02K 5/00* | (2006.01) |
| *F04D 29/58* | (2006.01) |
| *B64D 27/20* | (2006.01) |
| *F02C 7/36* | (2006.01) |
| *B64D 27/02* | (2006.01) |

(52) U.S. Cl.
CPC .............. *F02K 3/072* (2013.01); *F02K 5/00* (2013.01); *B64D 27/20* (2013.01); *B64D 2027/026* (2013.01); *F02C 7/36* (2013.01); *F04D 29/5806* (2013.01); *F04D 29/5813* (2013.01); *F05D 2260/213* (2013.01); *F05D 2260/40311* (2013.01)

(58) Field of Classification Search
CPC ............ F02K 3/072; F02K 5/00; F02K 3/062
See application file for complete search history.

(56) References Cited

U.S. PATENT DOCUMENTS

| | | | | |
|---|---|---|---|---|
| 3,811,791 | A  * | 5/1974 | Cotton | B64C 11/00 416/129 |
| 2011/0243735 | A1 * | 10/2011 | Balk | F02C 3/067 416/129 |
| 2015/0211444 | A1 | 7/2015 | Suciu et al. | |
| 2015/0308351 | A1 * | 10/2015 | Sheridan | F01D 25/18 60/39.08 |
| 2016/0215696 | A1 * | 7/2016 | Snyder | F02C 7/12 |
| 2017/0081035 | A1 | 3/2017 | Becker et al. | |
| 2017/0284351 | A1 * | 10/2017 | Incerpi | F02C 7/236 |

(Continued)

FOREIGN PATENT DOCUMENTS

GB    2542184    3/2017

OTHER PUBLICATIONS

EP Application No. 19165294.0 Extended EP Search Report dated Sep. 19, 2019, 5 pages.

*Primary Examiner* — Katheryn A Malatek
(74) *Attorney, Agent, or Firm* — Cantor Colburn LLP (57) ABSTRACT

A boundary layer ingestion engine includes a fan section configured to extend into a boundary layer of a full annulus of an aft end of a fuselage of an aircraft. The fan section includes a first fan stage and a second fan stage. The boundary layer ingestion engine also includes a differential planetary gear system is operable to transform rotation of an input shaft into counter rotation of a first shaft coupled to the first fan stage and a second shaft coupled to the second fan stage. The boundary layer ingestion engine further includes a motor operable to drive rotation of the input shaft.

20 Claims, 6 Drawing Sheets

(56) References Cited

U.S. PATENT DOCUMENTS

| | | |
|---|---|---|
| 2017/0297727 A1 | 10/2017 | Niergarth et al. |
| 2018/0037331 A1 | 2/2018 | Suciu et al. |
| 2018/0050810 A1* | 2/2018 | Niergarth .............. F04D 29/056 |
| 2018/0051654 A1 | 2/2018 | Suciu et al. |
| 2018/0051716 A1 | 2/2018 | Cheung et al. |

* cited by examiner

AFT COUNTER-ROTATING BOUNDARY LAYER INGESTION ENGINE

BACKGROUND

Exemplary embodiments pertain to aircraft engines, and more particularly to systems and methods for an aft counter-rotating boundary layer ingestion engine.

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection.

During flight, air passing over the fuselage of the aircraft forms a boundary layer immediately adjacent the fuselage due to friction between the air and the fuselage. The boundary layer resists forward motion through the air. In order to overcome the resistance of the boundary layer, the engines are typically oversized relative to a thrust requirement of the aircraft were the boundary layer to not be present.

BRIEF DESCRIPTION

Disclosed is a boundary layer ingestion engine that includes a fan section configured to extend into a boundary layer of a full annulus of an aft end of a fuselage of an aircraft. The fan section includes a first fan stage and a second fan stage. The boundary layer ingestion engine also includes a differential planetary gear system operable to transform rotation of an input shaft into counter rotation of a first shaft coupled to the first fan stage and a second shaft coupled to the second fan stage. The boundary layer ingestion engine also includes a motor operable to drive rotation of the input shaft.

In addition to one or more of the features described above or below, or as an alternative, further embodiments may include a cooling means for providing a motor cooling flow to the motor.

In addition to one or more of the features described above or below, or as an alternative, further embodiments may include a motor controller, where the cooling means is operable to provide a control cooling flow to the motor controller.

In addition to one or more of the features described above or below, or as an alternative, further embodiments may include where the cooling means is operable to provide a gear system cooling flow to the differential planetary gear system.

In addition to one or more of the features described above or below, or as an alternative, further embodiments may include where the cooling means includes at least one heat exchanger in fluid communication with an exhaust duct.

In addition to one or more of the features described above or below, or as an alternative, further embodiments may include a cooling fan operable to urge cooling air through the at least one heat exchanger and produce an exhaust flow.

In addition to one or more of the features described above or below, or as an alternative, further embodiments may include where the exhaust duct is configured to output the exhaust flow upstream of the fan section.

In addition to one or more of the features described above or below, or as an alternative, further embodiments may include where the first fan stage and the second fan stage each include a fan hub, a plurality of fan blades, and a full ring integral shroud.

In addition to one or more of the features described above or below, or as an alternative, further embodiments may include where the differential planetary gear system includes a sun gear operably coupled to the input shaft, a plurality of planetary gears, a carrier, and a ring gear.

In addition to one or more of the features described above or below, or as an alternative, further embodiments may include where the motor is an electric motor.

Also disclosed is a method that includes powering a motor operable to drive rotation of an input shaft. Counter rotation of a first shaft and a second shaft is driven through a differential planetary gear system responsive to rotation of the input shaft. Counter-rotation is performed of a first fan stage of a fan section of a boundary layer ingestion engine coupled to the first shaft and a second fan stage of the fan section coupled to the second shaft. The fan section is configured to extend into a boundary layer of a full annulus of an aft end of a fuselage of an aircraft.

In addition to one or more of the features described above or below, or as an alternative, further embodiments may include providing a motor cooling flow from a cooling system to the motor.

In addition to one or more of the features described above or below, or as an alternative, further embodiments may include providing a control cooling flow from the cooling system to a motor controller of the motor.

In addition to one or more of the features described above or below, or as an alternative, further embodiments may include providing a gear system cooling flow from the cooling system to the differential planetary gear system.

In addition to one or more of the features described above or below, or as an alternative, further embodiments may include where the cooling system includes at least one heat exchanger in fluid communication with an exhaust duct.

In addition to one or more of the features described above or below, or as an alternative, further embodiments may include urging cooling air through the at least one heat exchanger and producing an exhaust flow.

In addition to one or more of the features described above or below, or as an alternative, further embodiments may include outputting the exhaust flow from the exhaust duct upstream of the fan section.

Also disclosed is a propulsion system for an aircraft. The propulsion system includes at least one gas turbine engine, at least one electric generator operable to produce an electric current responsive to rotation driven by the at least one gas turbine engine, and a boundary layer ingestion engine. The boundary layer ingestion engine includes a fan section configured to extend into a boundary layer of a full annulus of an aft end of a fuselage of the aircraft. The fan section includes a first fan stage and a second fan stage.

In addition to one or more of the features described above or below, or as an alternative, further embodiments may include a cooling system operable to provide cooling to one or more of: the differential planetary gear system, the electric motor, and a motor controller of the electric motor.

A technical effect of systems and methods is achieved by providing an aft counter-rotating boundary layer ingestion engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
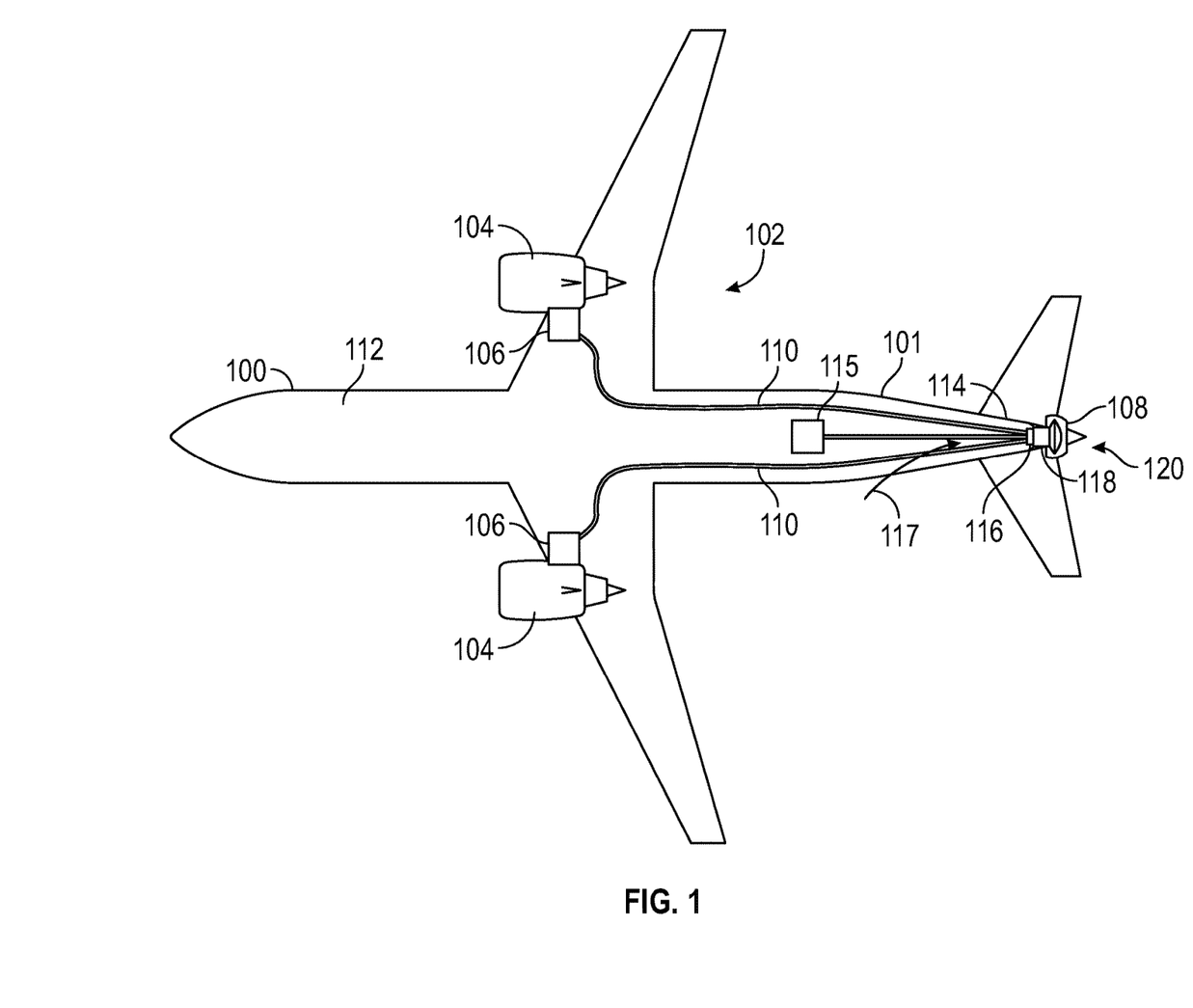
FIG. 1 is a schematic illustration of an aircraft including a propulsion system in accordance with an embodiment of the disclosure.

FIG. 1 schematically illustrates an exemplary aircraft 100 with a fuselage 101 and a propulsion system 102. The propulsion system 102 includes one or more conventional, wing mounted gas turbine engines 104, at least one electric generator 106 operable to produce an electric current responsive to rotation driven by the at least one gas turbine engine 104, and a boundary layer ingestion engine 108 that is a tail mounted aft counter-rotating engine. In the example of FIG. 1, the aircraft 100 includes a pair of gas turbine engines 104 each having an electric generator 106. The boundary layer ingestion engine 108 can be powered responsive to the electric current delivered through a power distribution system 110. One or more batteries 115 may also or alternatively provide electric current to the boundary layer ingestion engine 108. The electric current can power a motor controller 116 and a motor 118 of the boundary layer ingestion engine 108, where the motor 118 is an electric motor.

During flight operations, such as during a cruise mode of operations, a boundary layer forms along the surface of the fuselage 101. The boundary layer creates drag and resists forward motion of the aircraft 100. Conventional aircrafts size the gas turbine engines 104 to overcome the boundary layer drag during operation of the aircraft 100. This over-sizing of the gas turbine engines 104 can result in decreases in the efficiency of engine operation.

The presence of the boundary layer ingestion engine 108 in a tail section 114 at the aft end 120 of the aircraft 100 ingests the drag on the fuselage 101 and decreases the thrust requirement of the gas turbine engines 104. In some examples, the boundary layer ingestion engine 108 can generate up to 15% of the required thrust power for the aircraft 100. In such an example, the gas turbine engines 104 can be downsized to a corresponding 85% of the size that would be required absent the boundary layer ingestion engine 108.

Cooling air 117 may be drawn from ambient air. The cooling air 117 can be used directly or can be further cooled and conditioned to cool one or more components of the boundary layer ingestion engine 108. Using an electric motor 118 to drive rotation of the boundary layer ingestion engine 108 reduces air intake and exhaust flow volume, and thus ducting requirements, as compared to using another gas turbine engine 104 to mechanically drive rotation of the boundary layer ingestion engine 108. It will be understood that the aircraft 100 includes additional systems not depicted in FIG. 1.

Figure 2:
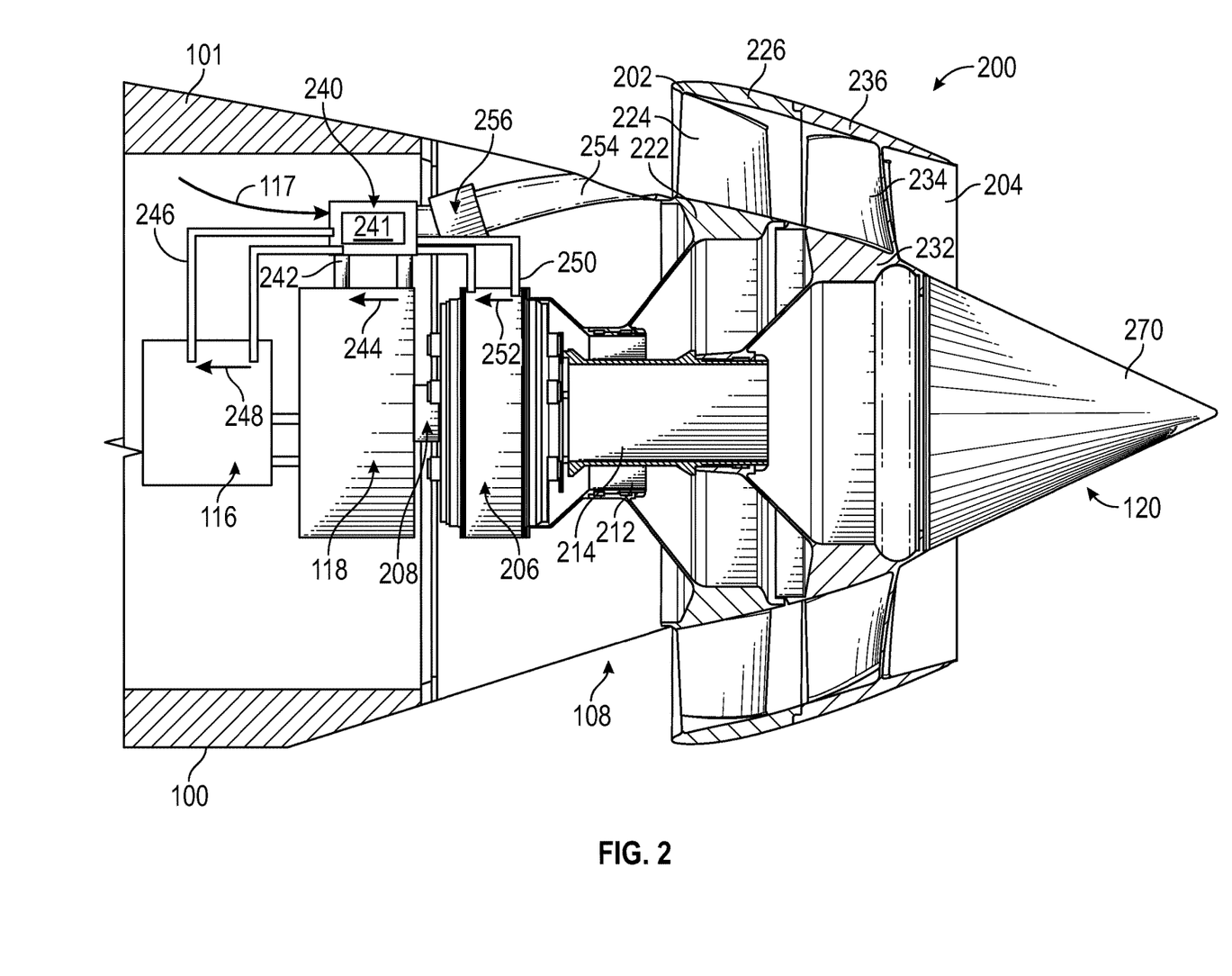
FIG. 2 is a schematic illustration of an aft counter-rotating boundary layer ingestion engine in accordance with an embodiment of the disclosure.
Figure 3:
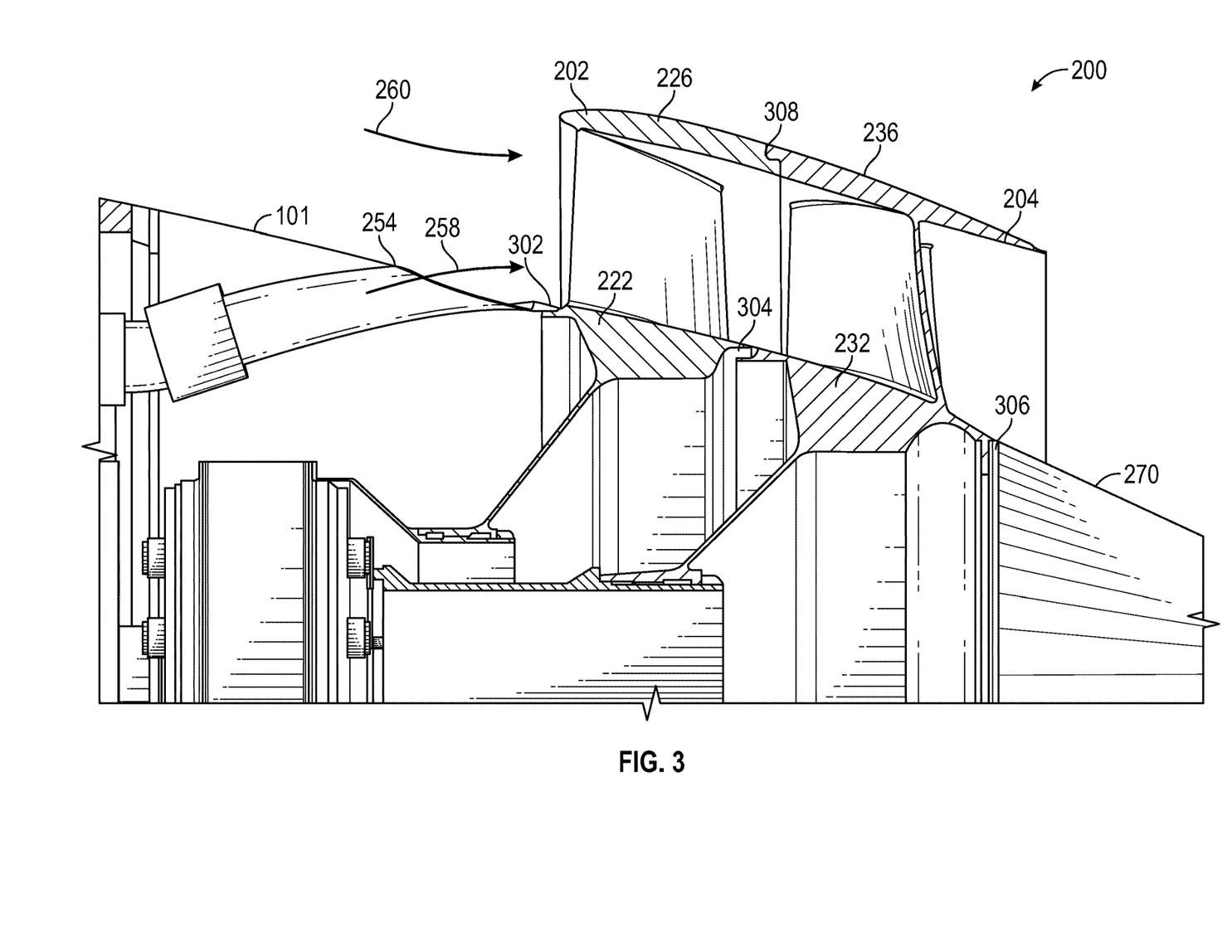
FIG. 3 is a schematic illustration of a counter-rotating fan section in greater detail in accordance with an embodiment of the disclosure.

FIGS. 2 and 3 depict the boundary layer ingestion engine 108 in greater detail according to embodiments. The boundary layer ingestion engine 108 can include a fan section 200 configured to extend into a boundary layer of a full annulus of the aft end 120 of the fuselage 101 of the aircraft 100. The fan section 200 includes a first fan stage 202 and a second fan stage 204. The boundary layer ingestion engine 108 can also include a differential planetary gear system 206 operable to transform rotation of an input shaft 208 into counter rotation of a first shaft 212 coupled to the first fan stage 202 and a second shaft 214 coupled to the second fan stage 204. The motor 118 is operable to drive rotation of the input shaft 208 responsive to electrical current selectively provided by the motor controller 116. Thus, input rotation of the input shaft 208 into the differential planetary gear system 206 can result in rotating the first shaft 212 along with a fan hub 222, a plurality of fan blades 224, and a full ring integral shroud 226 of the first fan stage 202 in a first rotational direction while also rotating the second shaft 214 along with a fan hub 232, a plurality of fan blades 234, and a full ring integral shroud 236 of the second fan stage 204 in a second rotational direction opposite the first rotational direction (e.g., clockwise and counter-clockwise). Counter rotation can eliminate the need for a static exit guide vane, which would be supported by a bearing compartment.

A cooling system 240, also referred to as a cooling means, can be included to cool various components of the boundary layer ingestion engine 108. For example, a motor cooling loop 242 can circulate a motor cooling flow 244 to the motor 118, a controller cooling loop 246 can circulate a control cooling flow 248 to the motor controller 116, and a gear system cooling loop 250 can circulate a gear system cooling flow 252 to the differential planetary gear system 206. Each of the cooling loops 242, 246, 250 can have a different heat exchanger section in thermal communication with the cooling air 117 or other cooling fluid in the cooling system 240. For example, the cooling system 240 can include one or more heat exchangers 241 that provide heat transfer from the motor cooling flow 244, the control cooling flow 248, and the gear system cooling flow 252. Different cooling fluids may be used for each of the motor cooling flow 244, the control cooling flow 248, and the gear system cooling flow 252. For example, a lubricating and heat transfer fluid used in the motor cooling flow 244 can differ from a lubricating and heat transfer fluid used in the gear system cooling flow 252. The motor controller 116 can include conventional motor control circuitry and may have different thermal loads and cooling requirements as compared to the motor 118 and the differential planetary gear system 206.

In embodiments, at least one heat exchanger 241 is in fluid communication with an exhaust duct 254. A cooling fan 256 is operable to urge cooling air 117 through the at least one heat exchanger 241 and produce an exhaust flow 258. The exhaust duct 254 is configured to output the exhaust flow 258 upstream of the fan section 200. The exhaust flow 258 can merge with an external flow 260 to pass through the fan section 200.

Several sealing interfaces can be formed between components of the boundary layer ingestion engine 108 and the fuselage 101, as best seen in FIG. 3. For example, sealing interface 302 can be formed between the fan hub 222 of the first fan stage 202 and the fuselage 101. A sealing interface 304 can be formed between the fan hub 222 of the first fan stage 202 and the fan hub 232 of the second fan stage 204. A sealing interface 306 can be formed between the fan hub 232 of the second fan stage 204 and a tail cone 270 of the aircraft 100. A sealing interface 308 can be formed between the full ring integral shroud 226 of the first fan stage 202 and the full ring integral shroud 236 of the second fan stage 204. In embodiments, the sealing interfaces 302, 306 can be implemented using knife-edge-seals, brush seals, non-contact floating seals, or any other air seal configuration known in the art.

Although one example of the boundary layer ingestion engine 108 is depicted in the examples of FIGS. 2 and 3, it will be understood that additional elements and modifications are contemplated. For instance, rotation and placement support structures, such as bearing systems, are not depicted for illustration clarity. Further, a nacelle or other structure may surround the fan section 200.

Figure 4:
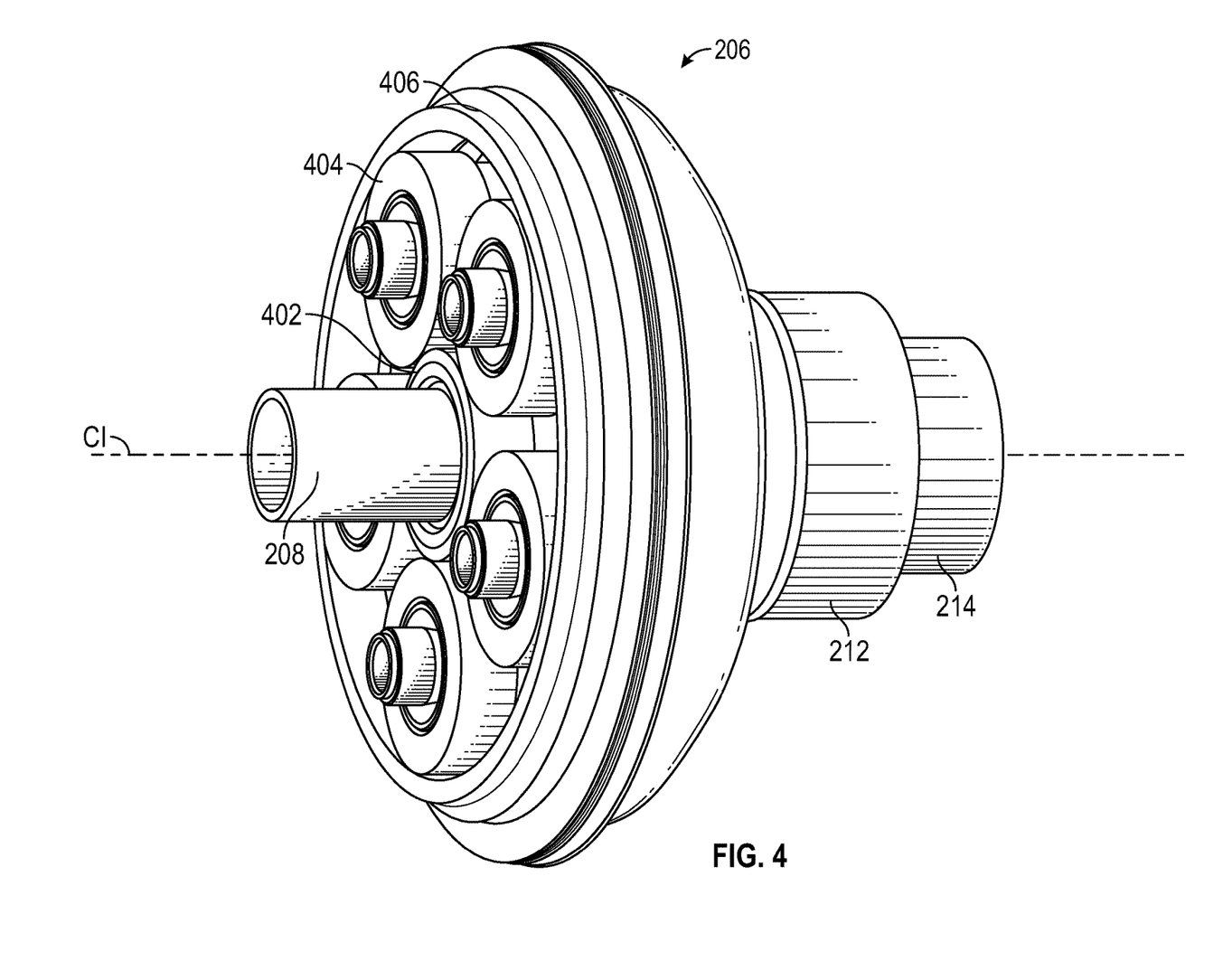
FIG. 4 is a schematic illustration of a differential planetary gear system in accordance with an embodiment of the disclosure.
Figure 5:
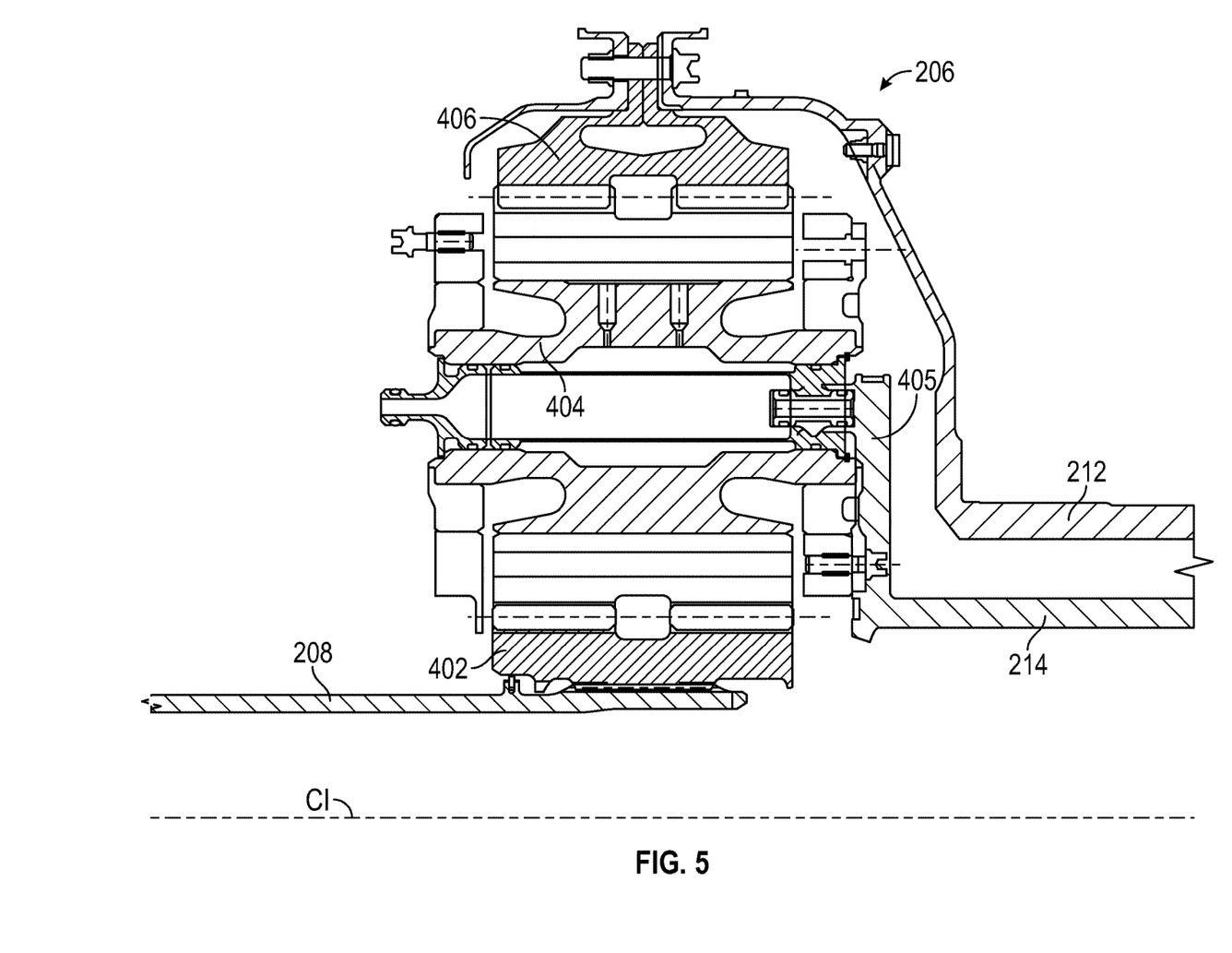
FIG. 5 is a sectional view of a differential planetary gear system in accordance with an embodiment of the disclosure.

FIGS. 4 and 5 depict an embodiment of the differential planetary gear system 206 of FIG. 2. The differential planetary gear system 206 includes a sun gear 402 operably coupled to the input shaft 208 and configured to rotate about an axis C1 that may concentrically align with the first shaft 212 and the second shaft 214 as output shafts of the differential planetary gear system 206. The differential planetary gear system 206 can also include a plurality of planetary gears 404 driven to rotate responsive to rotation of the sun gear 402. The planetary gears 404 can be supported by a carrier 405 that is configured to drive rotation of the second shaft 214 in the example of FIG. 5, where the carrier 405 is coupled to the second shaft 214. Rotation of the planetary gears 404 can drive rotation of a ring gear 406 that is configured to drive rotation of the first shaft 212 in the example of FIG. 5, where the ring gear 406 is coupled to the first shaft 212. The differential planetary gear system 206 can receive power through the sun gear 402 and output power through the carrier 405 and ring gear 406. In some embodiments, the differential configuration allows both the first shaft 212 and the second shaft 214 to rotate at the same velocity in opposite directions. It will be understood that alternate configurations are contemplated, such as coupling the carrier 405 to the first shaft 212, coupling the ring gear 406 to the second shaft 214, including various additional gears, support systems, lubrication systems, and the like.

Figure 6:
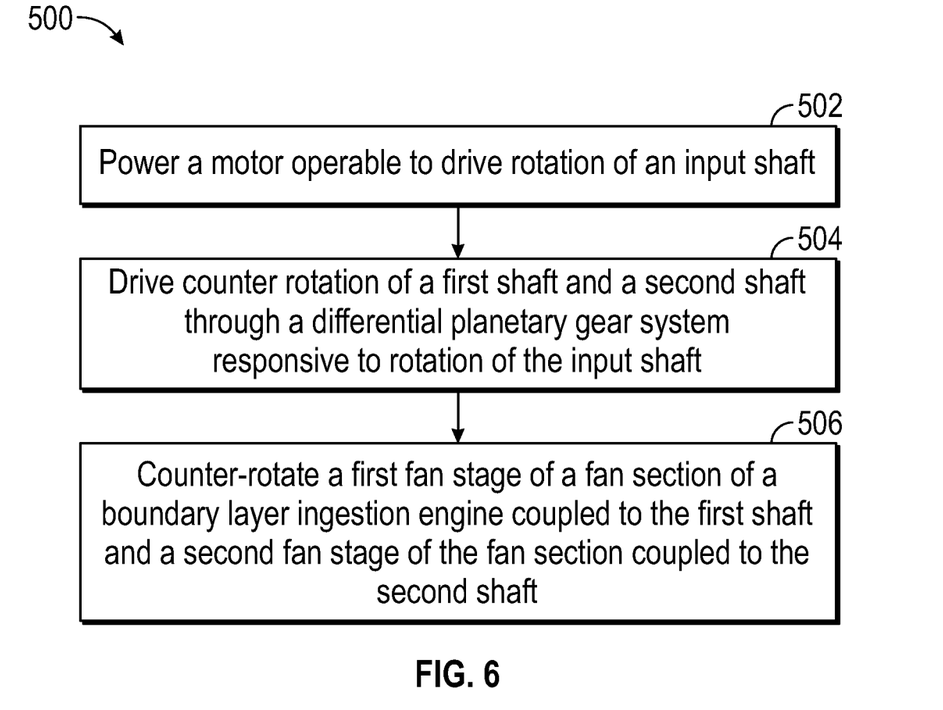
FIG. 6 is a flow chart illustrating a method in accordance with an embodiment of the disclosure.

FIG. 6 is a flow chart illustrating a method 500 of operating a boundary layer ingestion engine in accordance with an embodiment. The method 500 of FIG. 6 is described in reference to FIGS. 1-6 and may be performed with an alternate order and include additional steps. The method 500 can be performed, for example, by the boundary layer ingestion engine 108 of FIGS. 1-3.

At block 502, a motor 118 is powered to drive rotation of an input shaft 208. At block 504, counter rotation of a first shaft 212 and a second shaft 214 is driven through a differential planetary gear system 206 responsive to rotation of the input shaft 208. At block 506, a first fan stage 202 of a fan section 200 of a boundary layer ingestion engine 108 coupled to the first shaft 212 and a second fan stage 204 of the fan section 200 coupled to the second shaft 214 counter-rotate responsive to the output of the differential planetary gear system 206. The fan section 200 is configured to extend into a boundary layer of a full annulus of an aft end 120 of a fuselage 101 of an aircraft 100 and provide thrust responsive to the motor 118. A motor controller 116 can selectively control the flow of electric current to the motor 118 responsive to commands (e.g., a thrust request) as part of the propulsion system 102.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A boundary layer ingestion engine comprising:
a fan section configured to extend into a boundary layer of a full annulus of an aft end of a fuselage of an aircraft, the fan section comprising a first fan stage and a second fan stage, wherein the first fan stage and the second fan stage each comprise a full ring integral shroud radially outward of the respective fan stage, and a sealing interface is formed between the full ring integral shroud of the first fan stage and of the second fan stage;
a differential planetary gear system operable to transform rotation of an input shaft into counter rotation of a first shaft coupled to the first fan stage and a second shaft coupled to the second fan stage; and
a motor operable to drive rotation of the input shaft.

2. The boundary layer ingestion engine of claim 1, further comprising a cooling means for providing a motor cooling flow to the motor.

3. The boundary layer ingestion engine of claim 2, further comprising a motor controller, wherein the cooling means is operable to provide a control cooling flow to the motor controller.

4. The boundary layer ingestion engine of claim 2, wherein the cooling means is operable to provide a gear system cooling flow to the differential planetary gear system.

5. The boundary layer ingestion engine of claim 2, wherein the cooling means comprises at least one heat exchanger in fluid communication with an exhaust duct.

6. The boundary layer ingestion engine of claim 5, further comprising a cooling fan operable to urge cooling air through the at least one heat exchanger and produce an exhaust flow, wherein the cooling fan is downstream of the at least one heat exchanger.

7. The boundary layer ingestion engine of claim 6, wherein the exhaust duct is configured to output the exhaust flow upstream of the fan section.

8. The boundary layer ingestion engine of claim 1, wherein the first fan stage and the second fan stage each comprise a fan hub and a plurality of fan blades.

9. The boundary layer ingestion engine of claim 1, wherein the differential planetary gear system comprises: a sun gear operably coupled to the input shaft, a plurality of planetary gears, a carrier, and a ring gear.

10. The boundary layer ingestion engine of claim 1, wherein the motor is an electric motor.

11. A method comprising:
powering a motor operable to drive rotation of an input shaft;
driving counter rotation of a first shaft and a second shaft through a differential planetary gear system responsive to rotation of the input shaft; and
counter-rotating a first fan stage of a fan section of a boundary layer ingestion engine coupled to the first shaft and a second fan stage of the fan section coupled to the second shaft, the fan section configured to extend into a boundary layer of a full annulus of an aft end of a fuselage of an aircraft, wherein the first fan stage and the second fan stage each comprise a full ring integral shroud radially outward of the respective fan stage, and a sealing interface is formed between the full ring integral shroud of the first fan stage and of the second fan stage.

12. The method of claim 11, further comprising:
providing a motor cooling flow from a cooling system to the motor.

13. The method of claim 12, further comprising:
providing a control cooling flow from the cooling system to a motor controller of the motor.

14. The method of claim 12, further comprising:
providing a gear system cooling flow from the cooling system to the differential planetary gear system.

15. The method of claim 12, wherein the cooling system comprises at least one heat exchanger in fluid communication with an exhaust duct.

16. The method of claim 15, further comprising:
urging cooling air through the at least one heat exchanger and producing an exhaust flow.

17. The method of claim 16, further comprising:
outputting the exhaust flow from the exhaust duct upstream of the fan section.

18. The method of claim 11, wherein the differential planetary gear system comprises a sun gear operably coupled to the input shaft, a plurality of planetary gears, a carrier, and a ring gear.

19. A propulsion system for an aircraft, the propulsion system comprising:
at least one gas turbine engine;
at least one electric generator operable to produce an electric current responsive to rotation driven by the at least one gas turbine engine; and
a boundary layer ingestion engine comprising:
a fan section configured to extend into a boundary layer of a full annulus of an aft end of a fuselage of the aircraft, the fan section comprising a first fan stage and a second fan stage, wherein the first fan stage and the second fan stage each comprise a full ring integral shroud radially outward of the respective fan stage, and a sealing interface is formed between the full ring integral shroud of the first fan stage and of the second fan stage;
a differential planetary gear system operable to transform rotation of an input shaft into counter rotation of a first shaft coupled to the first fan stage and a second shaft coupled to the second fan stage; and
an electric motor selectively powered responsive to the electric current and operable to drive rotation of the input shaft.

20. The propulsion system of claim 19, further comprising a cooling system operable to provide cooling to the differential planetary gear system, the electric motor, and a motor controller of the electric motor.

* * * * *